(12) United States Patent
Han et al.

(10) Patent No.: US 11,670,339 B2
(45) Date of Patent: Jun. 6, 2023

(54) VIDEO ACQUISITION METHOD AND DEVICE, TERMINAL AND MEDIUM

(71) Applicant: BEIJING MICROLIVE VISION TECHNOLOGY CO., LTD, Beijing (CN)

(72) Inventors: Xu Han, Beijing (CN); Halting Wang, Beijing (CN); Pingfei Fu, Beijing (CN)

(73) Assignee: BEIJING MICROLIVE VISION TECHNOLOGY CO., LTD, Beijing (CN)

( * ) Notice: Subject to any disclaimer, the term of this patent is extended or adjusted under 35 U.S.C. 154(b) by 0 days.

(21) Appl. No.: 16/981,015

(22) PCT Filed: Dec. 28, 2018

(86) PCT No.: PCT/CN2018/124779
§ 371 (c)(1),
(2) Date: Sep. 15, 2020

(87) PCT Pub. No.: WO2020/062683
PCT Pub. Date: Apr. 2, 2020

(65) Prior Publication Data
US 2021/0225406 A1    Jul. 22, 2021

(30) Foreign Application Priority Data
Sep. 30, 2018  (CN) .......................... 201811161966.8

(51) Int. Cl.
*G11B 27/031*   (2006.01)
*G06F 3/04842*  (2022.01)

(52) U.S. Cl.
CPC ........ *G11B 27/031* (2013.01); *G06F 3/04842* (2013.01)

(58) Field of Classification Search
CPC .......................... G11B 27/031; G06F 3/04842
See application file for complete search history.

(56) References Cited

U.S. PATENT DOCUMENTS 9,148,618 B2 *  9/2015  Matas ................ G06F 3/04842
9,531,987 B1 * 12/2016  Melo .................... G11B 31/006
(Continued)

FOREIGN PATENT DOCUMENTS

| CN | 103745736 A | 4/2014 |
|----|-------------|--------|
| CN | 105142017 A | 12/2015 |

(Continued)

OTHER PUBLICATIONS

Office Action dated Oct. 30, 2019 for Chinese Patent Application No. 201811161966.
(Continued)

*Primary Examiner* — Jeremy L Stanley
(74) *Attorney, Agent, or Firm* — Thomas | Horstemeyer, LLP

(57) ABSTRACT

Disclosed is a video acquisition method. The method includes acquiring at least two existing video segments selected by a user through a video selection interface, where the video selection interface is an interface which is switched from a video capture interface or a detail interface; and synthesizing the at least two existing video segments into a target video that has a duration less than or equal to a preset video duration based on the preset video duration. Further disclosed are a video acquisition device, a terminal and a storage medium.

17 Claims, 7 Drawing Sheets

(56) References Cited

U.S. PATENT DOCUMENTS

| | | | |
|---|---|---|---|
| 9,578,256 B1* | 2/2017 | Gregg | G11B 27/036 |
| 9,838,731 B1* | 12/2017 | Matias | H04N 21/4302 |
| 9,881,645 B2* | 1/2018 | Novikoff | G11B 27/031 |
| 10,269,388 B2* | 4/2019 | Lettau | G11B 27/031 |
| 10,891,103 B1* | 1/2021 | Venti | G06F 16/435 |
| 2008/0155459 A1* | 6/2008 | Ubillos | G11B 27/034 |
| | | | 715/783 |
| 2008/0288869 A1* | 11/2008 | Ubillos | G06F 16/58 |
| | | | 715/716 |
| 2012/0308209 A1* | 12/2012 | Zaletel | G11B 31/006 |
| | | | 386/278 |
| 2014/0160320 A1* | 6/2014 | Babale | H04N 5/232933 |
| | | | 348/239 |
| 2014/0211962 A1 | 7/2014 | Davis | |
| 2015/0156552 A1* | 6/2015 | Wayans | H04N 21/4223 |
| | | | 386/230 |
| 2015/0220249 A1* | 8/2015 | Snibbe | G06F 3/04842 |
| | | | 715/719 |
| 2015/0277705 A1* | 10/2015 | Autioniemi | G06F 3/04883 |
| | | | 715/723 |
| 2016/0064035 A1 | 3/2016 | Bostick et al. | |
| 2016/0216871 A1* | 7/2016 | Stamatiou | G06F 3/04845 |
| 2017/0024097 A1* | 1/2017 | Lu | G06Q 30/0241 |
| 2017/0025153 A1* | 1/2017 | Svendsen | G06T 13/80 |
| 2017/0025163 A1 | 1/2017 | Luan et al. | |
| 2017/0201478 A1* | 7/2017 | Joyce | H04L 67/42 |
| 2017/0229147 A1* | 8/2017 | McKaskle | H04N 21/41407 |
| 2017/0236549 A1* | 8/2017 | Dittmer-Roche | H04N 5/262 |
| | | | 386/241 |
| 2017/0256288 A1* | 9/2017 | Ai | H04N 5/2628 |
| 2018/0070026 A1* | 3/2018 | Nussbaum | H04N 5/23293 |
| 2018/0091728 A1* | 3/2018 | Brown | G06F 3/0488 |
| 2018/0268870 A1* | 9/2018 | Chen | H04N 21/6587 |
| 2020/0186887 A1* | 6/2020 | Kwon | H04N 21/854 |

FOREIGN PATENT DOCUMENTS

| | | |
|---|---|---|
| CN | 105187733 A | 12/2015 |
| CN | 105338259 A | 2/2016 |
| CN | 105530440 A | 4/2016 |
| CN | 106331869 A | 1/2017 |
| CN | 106878587 A | 6/2017 |
| CN | 107085612 A | 8/2017 |
| CN | 107155128 A | 9/2017 |
| CN | 107872620 A | 4/2018 |
| CN | 108024083 A | 5/2018 |
| CN | 108419035 A | 8/2018 |
| CN | 108471554 A | 8/2018 |
| CN | 108600825 A | 9/2018 |
| CN | 108833787 A | 11/2018 |
| CN | 108833787 B | 6/2021 |
| EP | 3249609 A1 | 11/2017 |
| JP | 2006140564 A | 6/2006 |
| JP | 2011124852 A | 6/2011 |
| JP | 2011124852 A | 12/2012 |
| JP | 2014183426 A | 9/2014 |
| JP | 2015029213 A | 2/2015 |
| JP | 2016058792 A | 4/2016 |
| JP | 2017073644 A | 4/2017 |

OTHER PUBLICATIONS

Office Action dated Jan. 25, 2021 for Chinese Patent Application No. 201811161966.
Supplementary Search Report dated Jan. 18, 2021 for Chinese Patent Application No. 201811161966.
Jingyan Baidu "How to Upload Multiple Videos" (2018).
International Search Report and Written Opinion dated Jun. 10, 2019 for PCT Patent Application No. PCT/CN2018/124779.
1st Search Report for Chinese Patent Application No. 201811161966.8.
1st Office Action dated May 23, 2019 for Chinese Patent Application No. 201811161966.8.
2nd Office Action dated Aug. 13, 2019 for Chinese Patent Application No. 201811161966.8.
Supplementary Search dated Feb. 25, 2020 for Chinese Patent Application No. 201811161966.8.
"How to upload multiple videos at the same time douyin new features introduction" jingyan.baidu.com (2018).
"How does Douyin combine videos" jingyan.baidu.com (2018).
Japanese Office Action for Japanese Patent Application No. 2020-564991 dated Sep. 30, 2021.
Japanese Office Action for Japanese Patent Application No. 2020-564991 dated May 25, 2022.
Great Britain Office Action for Great Britain Patent Application No. GB2017353.0 dated Mar. 30, 2022.
Great Britain Office Action for Great Britain Patent Application No. GB2017353.0 dated Sep. 16, 2022.

* cited by examiner

VIDEO ACQUISITION METHOD AND DEVICE, TERMINAL AND MEDIUM

CROSS-REFERENCE TO RELATED APPLICATIONS

This is a national stage application filed under 37 U.S.C. 371 based on International Patent Application No. PCT/CN2018/124779, filed on Dec. 28, 2018, which is based on and claims priority to a Chinese Patent Application No. CN201811161966.8 filed on Sep. 30, 2018, disclosures of which are incorporated herein by reference in their entireties.

TECHNICAL FIELD

Embodiments of the present disclosure relate to the technical field of the Internet, for example, to a video acquisition method and device, a terminal and a medium.

BACKGROUND

With the development of network technology, video interactive applications are popular in people's daily life.

For an Internet enterprise of video interactive applications, satisfying user requirements and providing users with satisfactory product experience are key factors that cannot be ignored in maintaining the competitiveness of the enterprise. For a wide range of user groups, video interactive applications can provide users with a variety of video resources, such as funny resources, humorous resources, scientific resources, current affairs and life resources. With video interactive applications, users can shoot videos of different styles anytime, anywhere, add one or more special effects and set different types of background music.

However, relevant video interactive software has a relative simple function and cannot satisfy users' requirements for sharing personalized videos.

SUMMARY

Embodiments of the present disclosure provide a video acquisition method and device, a terminal and a medium to synthesize existing video segments into a complete video during video sharing.

In an embodiment of the present disclosure, a video acquisition method is provided. The method includes acquiring at least two existing video segments selected by a user through a video selection interface, where the video selection interface is an interface which is switched from a video capture interface or a detail interface; and synthesizing, based on a preset video duration, the at least two existing video segments into a target video that has a duration less than or equal to the preset video duration.

In an embodiment of the present disclosure, a video acquisition device is provided. The device includes a video segment acquisition module and a video synthesis module.

The video segment acquisition module is configured to acquire at least two existing video segments selected by a user through a video selection interface, where the video selection interface is an interface which is switched from a video capture interface or a detail interface.

The video synthesis module is configured to synthesize, based on the preset video duration, the at least two existing video segments into a target video that has a duration less than or equal to the preset video duration.

In an embodiment of the present disclosure, a terminal is provided. The terminal includes one or more processing devices; and a storage device configured to store one or more programs.

When executed by the one or more processing devices, the one or more programs cause the one or more processing devices to perform the video acquisition method as described in any embodiment of the present disclosure.

In an embodiment of the present disclosure, a computer-readable storage medium is provided. The computer-readable storage medium stores one or more programs. When executed by the one or more processing devices, the one or more programs cause the one or more processing devices to perform the video acquisition method as described in any embodiment of the present disclosure.

DETAILED DESCRIPTION

Figure 1:
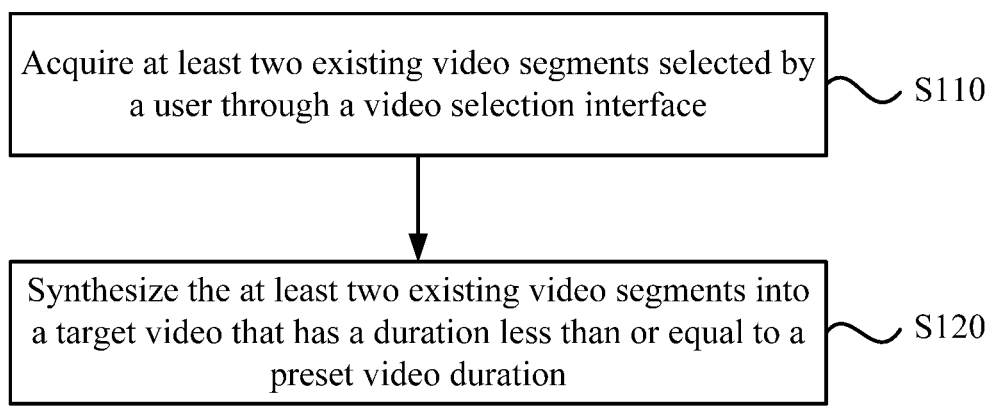
FIG. 1 is a flowchart of a video acquisition method according to an embodiment of the present disclosure.

The present disclosure is described below with reference to the drawings and embodiments. The embodiments described herein are intended only to explain the present disclosure and not to limit the present disclosure. In addition, for ease of description, only some, rather than all, of the structures associated with the present disclosure are shown in the drawings.

Optional features and examples are provided in at least one of the embodiments described below. At least one of the features described in the embodiments may be combined into multiple alternatives.

Embodiment One

FIG. 1 is a flowchart of a video acquisition method according to an embodiment of the present disclosure. The method is applicable to the case where existing video segments are synthesized into a complete video during video sharing by a user. The method may be executed by a video acquisition device. The device may be implemented by software and/or hardware, and may be configured on any terminal having a network communication function, for example, a smartphone, a computer or a portable Android device (PAD).

As shown in FIG. 1, the video acquisition method provided in this embodiment of the present disclosure may include S110 and S120.

In S110, at least two existing video segments selected by a user through a video selection interface are acquired, where the video selection interface is an interface which is switched from a video capture interface or a detail interface.

A video interactive application not only allows the user to share a video shot on the spot, but also allows the user to share a video synthesized from existing video segments. After the user enables a video interactive application on a terminal, it is feasible to trigger the specific identifier of the video capture interface or the detail interface of the video interactive application, such as an uploading identifier or a sharing identifier, to switch the video interactive application from the current interface to the video selection interface. That is, the user triggers the specific identifier of the video capture interface or the detail interface to cause the video selection interface to be displayed. The detail interface may be another information detail interface such as a music detail interface or a video resource detail interface. The video selection interface can synchronously display existing local video segments of the terminal to facilitate user selection. If the video selection interface is switched from the music detail interface, the user may use the audio of the music detail interface as the background music of the synthesized video.

During the user selection, the user may touch the position of a video thumbnail on the video selection interface to preview the video to determine whether to select the video segment. In an embodiment, the duration of a user-selected existing video segment is greater than or equal to a duration threshold. That is, the duration threshold determines a valid video segment selectable by the user. Exemplarily, the duration threshold is set to 3 seconds. When the duration of existing video segment A selected by the user is 2 seconds, a prompt box (toast) may pop up to prompt that existing video segment A selected by the user is invalid and the user needs to reselect another segment. The number of user-selectable existing video segments may be adaptively set, for example, may be set to 12. The number of user-selectable existing video segments is not limited in this embodiment. Other video thumbnails on the video selection interface may cover the white masked layer and may no longer support the user selection when the number of existing video segments selected by the user reaches a required preset number.

In an embodiment, acquiring the at least two existing video segments selected by the user through the video selection interface includes acquiring the at least two existing video segments selected by the user in response to a video multi-selection request triggered by the user on the video selection interface.

Figure 2:
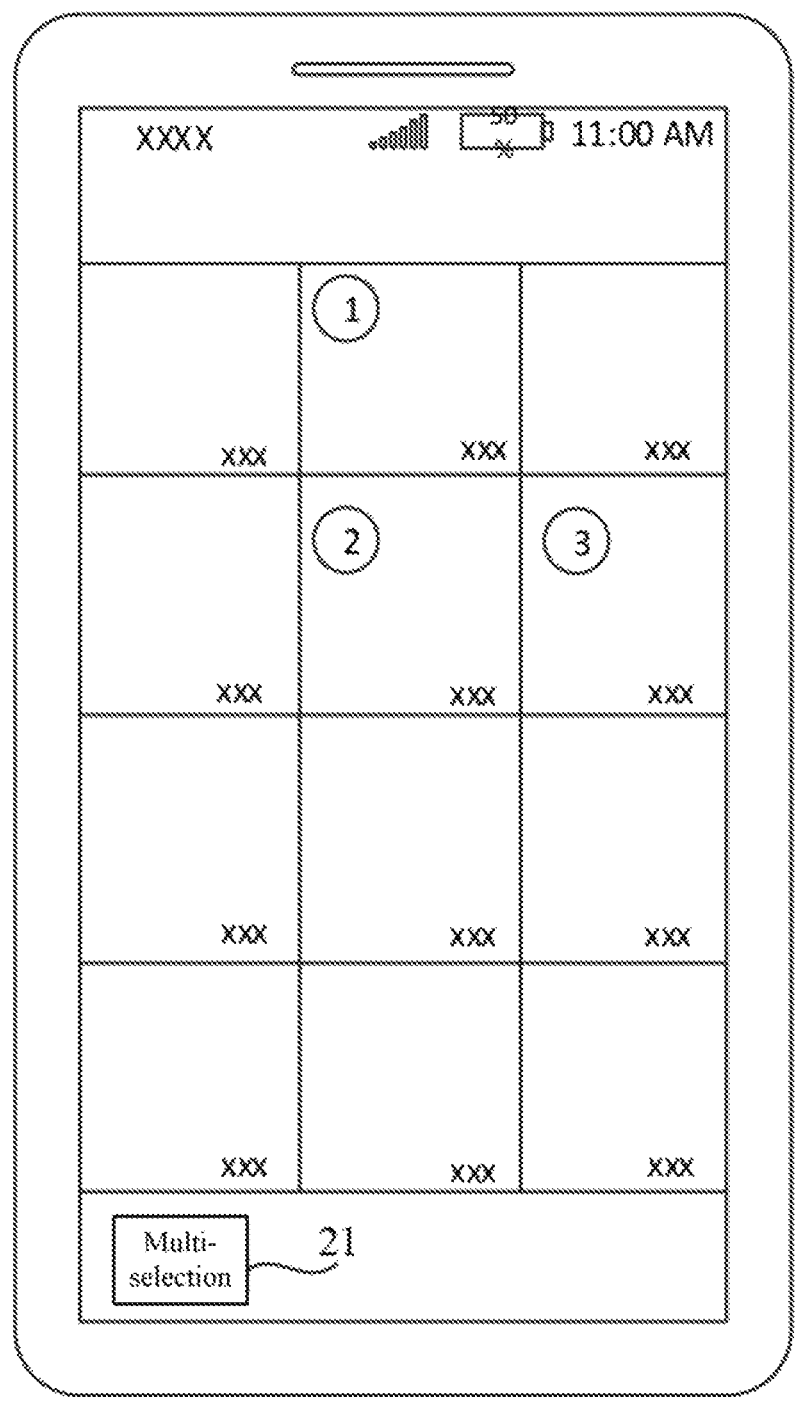
FIG. 2 is a schematic diagram of a video selection interface according to an embodiment of the present disclosure.

Exemplarily, FIG. 2 is a schematic diagram of a video selection interface according to an embodiment of the present disclosure. As shown in FIG. 2, a multi-selection control 21 may be disposed on the video selection interface, indicating that the user can currently select at least two existing video segments. The multi-selection control may be disposed at any position at the edge of the interface. In FIG. 2, the multi-select control is exemplarily disposed at the lower left. The video interactive application acquires, in real time, existing video segments selected by the user in response to the video multi-selection request of the user when detecting that the user clicks on the multi-selection control. In an embodiment, FIG. 2 includes time (exemplarily, before 12 AM) and power.

In S120, the at least two existing video segments are synthesized, based on a preset video duration, into a target video that has a duration less than or equal to the preset video duration.

In an embodiment, it is feasible to synthesize the at least two existing video segments into a complete video that has a duration less than or equal to the preset video duration by using a video synthesis technique. These video segments are synthesized in a video arrangement order set by the user autonomously or a video arrangement order preset by the video interactive application. When the total duration of the at least two existing video segments is greater than the preset video duration, the video interactive application can acquire the video start point and the video end point selected by the user and obtain the target video by video clipping. After the target video is synthesized, the user may save the target video in an appropriate video format to a specific local storage location or may upload the target video to a server to share the target video.

The preset video duration may be adaptively set, for example, to 15 seconds and is not limited in this embodiment. The duration of the synthesized target video is limited so that the following problem can be avoided: an excessively long uploaded video causes heavy pressure in data communication between the video interactive application and the server and affects user experience in video sharing.

In an embodiment, synthesizing the at least two existing video segments into the target video that has the duration less than or equal to the preset video duration based on the preset video duration includes synthesizing the at least two existing video segments into the target video that has the duration satisfying a preset video duration condition (that is, less than or equal to the preset video duration) according to a selection order of the at least two existing video segments. In this case, the touch order in which the user selects the existing video segments determines the order in which the video segments are arranged in the target video. As shown in FIG. 2, the user selects one existing video segment at each time, a number as the recording information of the existing video segment selected by the user is displayed in the upper left corner of the video thumbnail corresponding to the video segment and the video interactive application records the selection order of the user and information about the selected video segment.

In an embodiment, synthesizing the at least two existing video segments into the target video that has the duration less than or equal to the preset video duration based on the preset video duration includes synthesizing the at least two existing video segments into the target video that has the duration less than or equal to the preset video duration according to the preset video duration and a video editing mode, where the video editing mode includes at least one of an overall video editing mode or a segment video editing mode.

The user may edit and synthesize the existing video segments before sharing or may share a synthesized complete video without editing the existing video segments. In the case where the user edits the existing video segments, three editing modes are selectable by the user according to the video editing modes supported by the video interactive application. The three editing modes are described below.

(1) The user performs overall editing of a complete video preliminarily synthesized from the at least two existing video segments to obtain the target video.

(2) The user edits each existing video segment separately and synthesizes the edited video segments into the target video.

(3) The user adds the overall editing effect of a preliminarily synthesized complete video to the editing effect of each existing video segment to obtain the final editing effect of each existing video segment and thereby synthesizes the target video.

In an embodiment, an editing operation in the video editing mode includes at least one of a clipping operation, a playback speed editing operation, a resolution editing operation, a played picture rotation operation, a video deletion operation, or a display effect adding operation. The various video editing operations of the user show diverse functions of the video interactive application and improve user experience by increasing the fun of producing a synthesized video by the user. In an embodiment, during video editing, the original video of an existing video segment does not change and what changes is only the video data as an intermediate file stored in the buffer of the terminal. Moreover, when the user edits the video for multiple times based on the overall video editing mode and the segment video editing mode, playback speed editing and resolution editing can always be performed based on original existing video segments so that the final editing effect of each existing video segment is obtained.

In an embodiment, the method further includes switching from a video editing interface to the video selection interface in response to detecting an editing abandoning request. The selection state of the at least two existing video segments by the user is maintained on the video selection interface. During video editing, if the user ends the current editing operation by touching the abandonment control on the video editing interface, the video interactive application is switched (returns) from the current video editing interface to the video selection interface. As shown in FIG. 2, after the video interactive application returns to the video selection interface, the selection state of the existing video segments by the user is maintained on the video selection interface. That is, the user can still synthesize the original existing video segments into the complete video to share a personalized video.

According to this embodiment of the present disclosure, at least two existing video segments selected by a user through a video selection interface are acquired, and then the at least two existing video segments are synthesized into a target video that has a duration less than or equal to a preset video duration based on the preset video duration. That is, a complete video is synthesized from the existing local video segments of a terminal. This solves the problem in which a video interactive application has no function to satisfy users' requirements for sharing personalized videos in the related art and enables synthesization of existing video segments into a complete video during video sharing, thereby expanding and enriching video sharing function of the video interactive application and breaking the limitation of a video sharing mode to an on-the-spot sharing mode. The user can autonomously make a synthesized video to be shared, improving user experience in sharing a personalized video and avoiding the complex operation on editing video segments by using professional video editing software in the related art, that is, improving the convenience of video editing.

Embodiment Two

Figure 3:
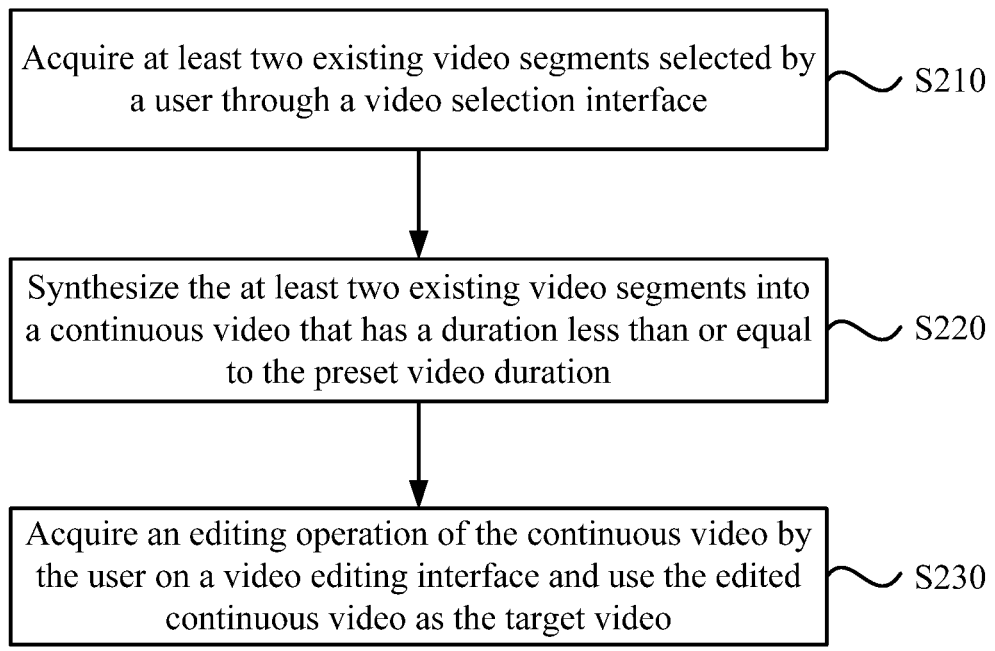
FIG. 3 is a flowchart of another video acquisition method according to an embodiment of the present disclosure.

FIG. 3 is a flowchart of another video acquisition method according to an embodiment of the present disclosure. The video acquisition method is described by way of example in which the video editing mode is an overall video editing mode.

As shown in FIG. 3, the video acquisition method provided in this embodiment of the present disclosure may include S210 to S230.

In S210, at least two existing video segments selected by a user through a video selection interface are acquired, where the video selection interface is an interface which is switched from a video capture interface or a detail interface.

In S220, the at least two existing video segments are synthesized into a continuous video that has a duration less than or equal to the preset video duration based on the preset video duration.

In the overall video editing mode, a video preliminarily synthesized from multiple existing video segments is an object edited in the process of synthesizing a target video. Thus, in this embodiment, after acquired, the existing video segments selected by the user are preliminarily synthesized into the continuous video based on the preset video duration. In this case, the duration of the continuous video may be same as or different from the duration of the final target video. In an embodiment, it is feasible to synthesize multiple existing video segments into the continuous video that has a duration less than or equal to the preset video duration based on the preset video duration in a video arrangement order, for example, the selection order of the existing video segments, by using a video synthesis technique in the process of synthesizing the continuous video.

In S230, an editing operation on the continuous video by the user on a video editing interface is acquired and the edited continuous video is used as the target video.

The video editing interface may be provided with a video preview area, and the video preview area is configured for effect preview during video editing. For example, after synthesis of the continuous video is completed, the user can preview the effect in the video preview area; if the user's editing operation on the continuous video is detected, the user can also preview the editing effect anytime when the editing operation is performed. In an embodiment, the editing operation of the continuous video includes at least one of a clipping operation, a playback speed editing operation, a resolution editing operation, a played picture rotation operation, a video deletion operation, or a display effect adding operation.

Through the clipping operation, the duration of the continuous video can be adjusted such that a target video satisfying the duration requirement can be obtained. Through the playback speed editing operation, the playback speed of the continuous video can be adjusted such that the continuous video can be played quickly or slowly. Through the resolution editing operation, the resolution of the played picture of the continuous video can be changed. Through the video deletion operation, multiple existing video segments included in the current continuous video can be deleted from the video editing interface, and a new continuous video can also be synthesized from the remaining existing video segments. Through the played picture rotation operation, the playback mode of the video can be changed, for example, from a landscape mode to a portrait mode. Through the display effect adding operation, for example, one or more filters are added, the picture display effect of the continuous video can be improved.

Exemplarily, the video clipping rule may include that when the total duration of the synthesized continuous video is less than or equal to the preset duration of the target video, it is feasible to determine whether to clip according to the user requirement, but the continuous video needs to fill the entire clipping area; when the total duration of the continuous video is greater than the preset duration of the target video, it is feasible to make, by clipping, the continuous video have a duration equal to the preset duration of the target video or clip according to the duration set by the user; when the video length, during clipping, reaches the maximum or minimum value required for the target video length, it is feasible to prevent the user from making an error in the clipping operation by providing a prompt such as vibration. After completion of the clipping operation, the video may be previewed.

Figure 4:
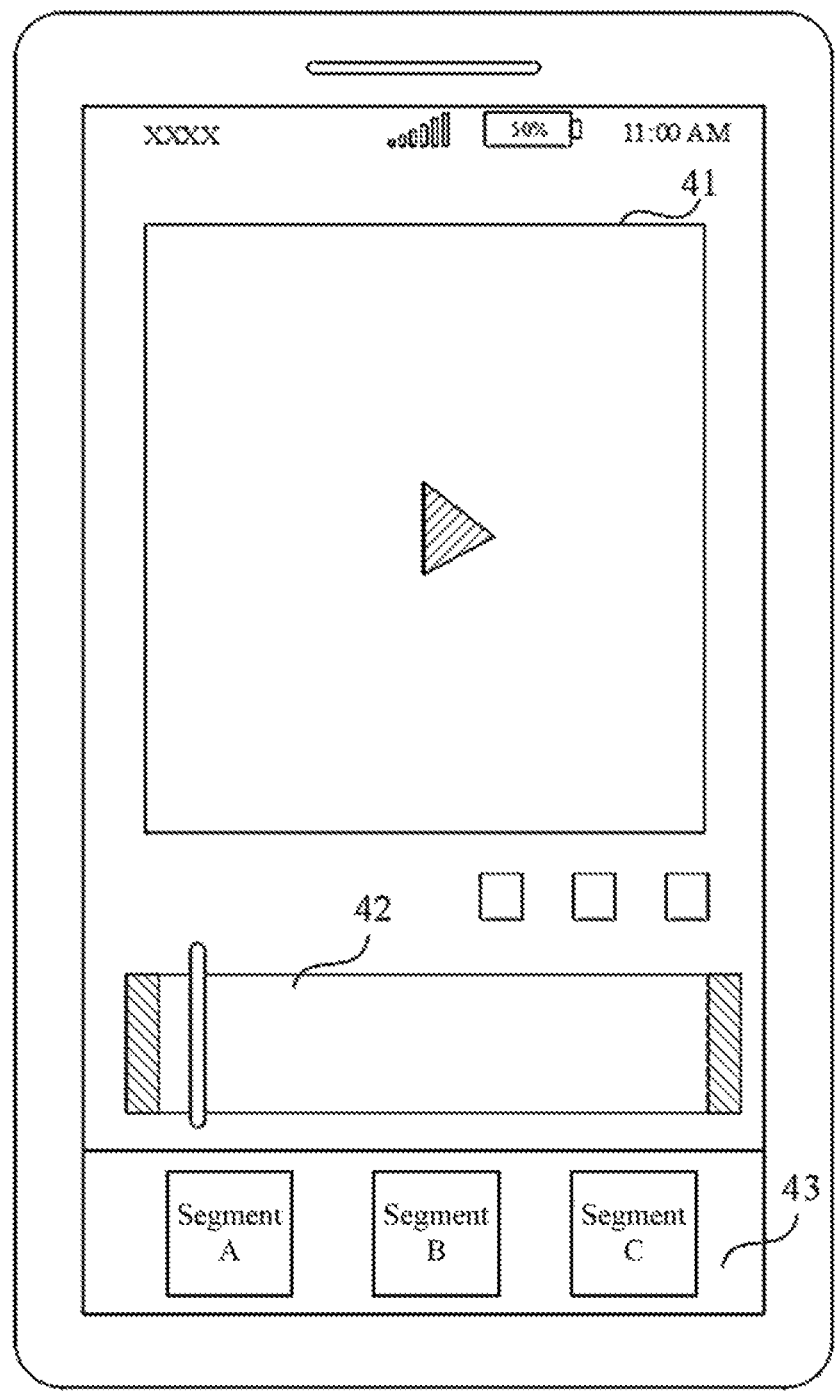
FIG. 4 is a schematic diagram of a video editing interface provided with a video preview area according to an embodiment of the present disclosure.

FIG. 4 is a schematic diagram of a video editing interface provided with a video preview area according to an embodiment of the present disclosure. As shown in FIG. 4, the video editing interface may be switched from the video selection interface. The video editing interface includes a video preview area 41, a video clipping area 42 and a video segment area 43. The video preview area 41 is configured for preview of a video editing effect in a video editing process. The handles on the left and right sides of the video clipping area 42 move as the user drags the handles to adjust the video duration of the preview. The pointer within the video clipping area 42 moves as the preview video is played. The video segment area 43 shows at least two existing video segments selected by the user. All the video segments selected by the user can be viewed by sliding left and right in the video segment area 43. The edge of the video editing interface or the gap between the video preview area 41 and the video clipping area 42 may be provided with editing controls, such as a clipping control, a playback speed editing control and a resolution editing control.

When the video interactive application detects the completion of the editing operation of the user, the successive video after editing is used as the target video, and the user can preview the effect of the target video in the video preview area. When an editing determination request triggered by the user on the video editing interface is detected, that is, all editing effects are reserved by the user, the target video is saved in the video format to a specific storage location on the terminal; when a video sharing request of the user is detected, the target video is shared on the server.

According to this embodiment of the present disclosure, at least two existing video segments selected by a user through a video selection interface are acquired; the at least two existing video segments are synthesized into a target video that has a duration less than or equal to a preset video duration based on the preset video duration; and then an editing operation on the continuous video by a user on a video editing interface is acquired and the edited continuous video is used as the target video. This solves the problem in which a video interactive application has no function to satisfy users' requirements for sharing personalized videos in the related art and enables synthesization of existing video segments into a complete video during video sharing, thereby expanding and enriching video sharing function and the video editing function of the video interactive application and breaking the limitation of a video sharing mode to an on-the-spot sharing mode. The user can autonomously make a synthesized video to be shared, improving user experience in sharing a personalized video.

Embodiment Three

Figure 5:
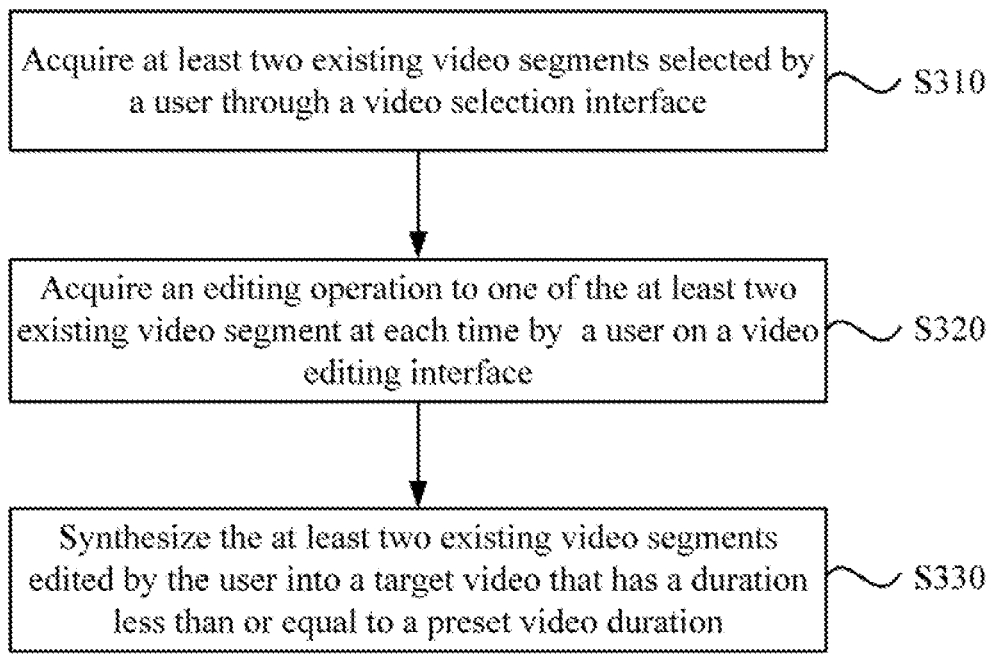
FIG. 5 is a flowchart of another video acquisition method according to an embodiment of the present disclosure.

FIG. 5 is a flowchart of another video acquisition method according to an embodiment of the present disclosure. The video acquisition method is described by way of example in which the video editing mode is a segment video editing mode.

As shown in FIG. 5, the video acquisition method provided in this embodiment of the present disclosure may include S310 to S330.

In S310, at least two existing video segments selected by a user through a video selection interface are acquired, where the video selection interface is an interface which is switched from a video capture interface or a detail interface.

In S320, an editing operation on one of the at least two existing video segments at each time by a user on a video editing interface is acquired.

In the segment video editing mode, a single existing video segment is an object edited in the process of synthesizing a target video. In an embodiment, the number of user editing operations is less than or equal to the number of existing video segments acquired. In an embodiment, the user's editing operation on each existing video segment includes at least one of a clipping operation, a playback speed editing operation, a resolution editing operation, a played picture rotation operation, a video deletion operation, or a display effect adding operation. Through the clipping operation, the duration of an existing video segment can be adjusted such that a video segment in which the user is interested can be obtained. Through the playback speed editing operation, the playback speed of a video segment can be adjusted such that the video segment can be played quickly or slowly. Through the resolution editing operation, the resolution of the played picture of a video segment can be changed such that existing video segments having a uniform resolution can be obtained, thereby ensuring the picture display effect of a synthesized target video. Through the video deletion operation, an existing video segment can be completely removed from the existing video segments selected by the user without returning to a video selection interface from the current video editing interface. Through the display effect operation, for example, one or more filters are added, the picture display effect of a video can be improved.

Figure 6:
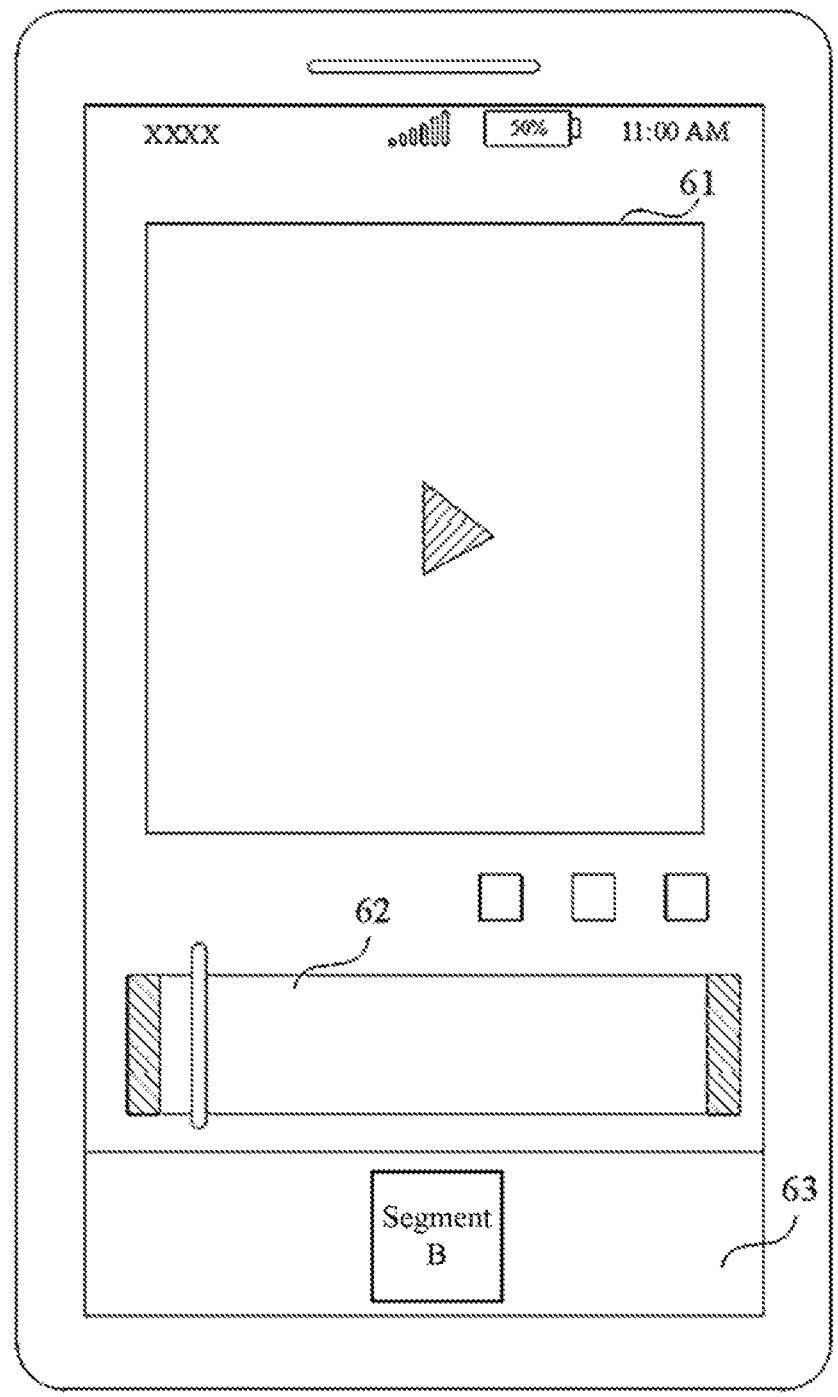
FIG. 6 is a schematic diagram of another video editing interface provided with a video preview area according to an embodiment of the present disclosure.

The video editing interface may be provided with a video preview area, and the video preview area is configured for editing effect preview of a single existing video segment. As an example, FIG. 6 is a schematic diagram of another video editing interface provided with a video preview area according to an embodiment of the present disclosure. As shown in FIG. 6, the video editing interface includes a video preview area 61, a video clipping area 62 and a video segment area 63. The video preview area 61 is configured for preview of the effect of the current video segment in a video editing process. The handles on the left and right sides of the video clipping area 62 move as the user drags the handles to adjust the duration of the currently previewed video segment. The pointer within the video clipping area 62 moves as the previewed video is played. The video segment area 63 shows a video segment currently edited by the user. The edge of the video editing interface or the gap between the video preview area 61 and the video clipping area 62 may be provided with editing controls, such as a clipping control, a playback speed editing control and a resolution editing control.

The editing interface for a single existing video segment shown in FIG. 6 may be switched from the video selection interface or may be switched from the video editing interface shown in FIG. 4. Exemplarily, when the user touches a segment video editing control (not shown in FIG. 4) on the video editing interface shown in FIG. 4, the video interactive application switches to the editing interface for a single existing video segment shown in FIG. 6 in response to the user's switching request.

In S330, the at least two existing video segments edited by the user are synthesized into a target video that has a duration less than or equal to a preset video duration based on the preset video duration.

When detecting that the editing operation of the user is completed, the video interactive application synthesizes the edited existing video segments into the target video that has a duration less than or equal to the preset video duration in a video arrangement order, for example, the order in which the user selects the existing video segments. The user can preview the effect of the target video in the video preview area. When an editing determination request triggered by the user on the video editing interface is detected, that is, all editing effects are reserved by the user, the target video is saved in the video format to a specific storage location on the terminal; when a video sharing request of the user is detected, the target video is shared on the server.

In an embodiment, in the process of synthesizing the edited existing video segments into the target video, if the user performs clipping editing, the clipping rule includes that the first and last frames of the target video are determined and then the clipping operation is performed according to the required duration of the target video; or only the first frame of the target video is determined and then the clipping operation is performed according to the required duration of the target video. The clipping rule may depend on the user's requirements for the target video.

According to this embodiment of the present disclosure, at least two existing video segments selected by a user through a video selection interface are acquired; an editing operation on one of the at least two existing video segments at each time by a user on a video editing interface is acquired; and then the at least two existing video segments edited by the user are synthesized into a target video that has a duration less than or equal to a preset video duration based on the preset video duration. This solves the problem in which a video interactive application has no function to satisfy users' requirements for sharing personalized videos in the related art and enables synthesization of existing video segments into a complete video during video sharing, thereby expanding and enriching video sharing function and the video editing function of the video interactive application and breaking the limitation of a video sharing mode to an on-the-spot sharing mode. The user can autonomously make a synthesized video to be shared, improving user experience in sharing a personalized video.

Embodiment Four

Figure 7:
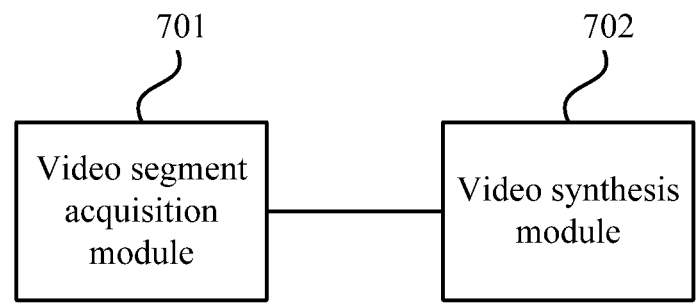
FIG. 7 is a structure diagram of a video acquisition device according to an embodiment of the present disclosure.

FIG. 7 is a structure diagram of a video acquisition device according to an embodiment of the present disclosure. This embodiment is applicable to the case where existing video segments are synthesized into a complete video during video sharing by a user. The video acquisition device may be implemented by software and/or hardware and may be configured on any terminal having a network communication function.

As shown in FIG. 7, the video acquisition device provided in this embodiment of the present disclosure may include a video segment acquisition module 701 and a video synthesis module 702.

The video segment acquisition module 701 is configured to acquire at least two existing video segments selected by a user through a video selection interface, where the video selection interface is an interface which is switched from a video capture interface or a detail interface.

The video synthesis module 702 is configured to synthesize, based on a preset video duration, the at least two existing video segments into a target video that has a duration less than or equal to the preset video duration.

In an embodiment, the video synthesis module 702 is configured to synthesize the at least two existing video segments into the target video that has the duration less than or equal to the preset video duration according to the preset video duration and a video editing mode, where the video editing mode includes at least one of an overall video editing mode or a segment video editing mode.

In an embodiment, if the video editing mode is the overall video editing mode, the video synthesis module 702 includes a continuous-video synthesis unit and a target-video determination unit.

The continuous-video synthesis unit is configured to synthesize the at least two existing video segments into a continuous video that has a duration less than or equal to the preset video duration based on the preset video duration.

The target-video determination unit is configured to acquire an editing operation on the continuous video by a user on a video editing interface and use the edited continuous video as the target video.

In an embodiment, if the video editing mode is the segment video editing mode, the video synthesis module 702 includes an editing operation acquisition unit and a target-video synthesis unit.

The editing operation acquisition unit is configured to acquire an editing operation on one of the at least two existing video segments at each time by a user on a video editing interface.

The target-video synthesis unit is configured to synthesize the edited at least two existing video segments into the target video that has the duration less than or equal to the preset video duration based on the preset video duration.

In an embodiment, the video editing interface is provided with a video preview area, and the video preview area is configured for effect preview during video editing.

In an embodiment, an editing operation in the video editing mode includes at least one of a clipping operation, a playback speed editing operation, a resolution editing operation, a played picture rotation operation, a video deletion operation, or a display effect adding operation.

In an embodiment, the video synthesis module 702 is configured to synthesize the at least two existing video segments into the target video that has the duration less than or equal to the preset video duration according to a selection order of the at least two existing video segments.

In an embodiment, the video segment acquisition module 701 is configured to acquire the at least two existing video segments selected by the user in response to a video multi-selection request triggered by the user on the video selection interface.

In an embodiment, the duration of each of the at least two existing video segments selected by the user is greater than or equal to a duration threshold.

In an embodiment, the device further includes an interface switching module. The interface switching module is configured to switch from a video editing interface to the video selection interface in response to detecting an editing abandoning request, where the selection state of the at least two existing video segments by the user is maintained on the video selection interface.

The video acquisition device may perform the video acquisition method provided in any embodiment of the present disclosure and may have function modules and effects corresponding to the video acquisition method.

Embodiment Five

Figure 8:
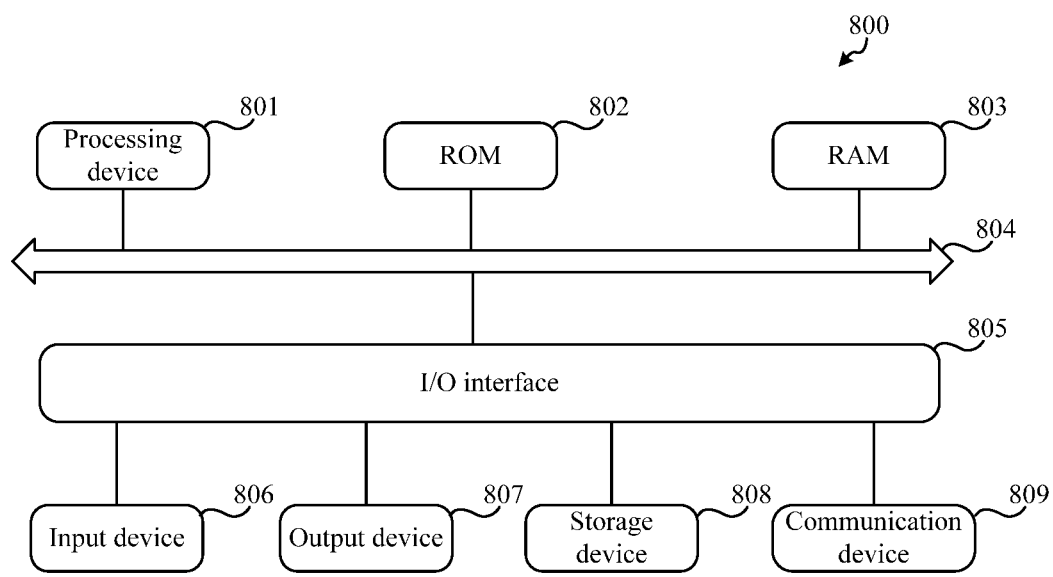
FIG. 8 is a schematic diagram of a hardware structure of a terminal according to an embodiment of the present disclosure.

FIG. 8 is a schematic diagram of a hardware structure of a terminal according to an embodiment of the present disclosure. Referring to FIG. 8, FIG. 8 shows a structure diagram of a terminal 800 suitable for implementing embodiments of the present disclosure. The terminal in each embodiment of the present disclosure may include, but is not limited to, a mobile terminal such as a mobile phone, a notebook computer, a digital broadcast receiver, a personal digital assistant (PDA), a portable Android device (PAD), a portable media player (PMP) or a vehicle-mounted terminal (for example, a vehicle-mounted navigation terminal) or a fixed terminal such as a digital television (TV) or a desktop computer. The terminal shown in FIG. 8 is merely an example not intended to limit the functionality and scope of use of embodiments of the present disclosure.

As shown in FIG. 8, the terminal 800 may include one or more processing devices (for example, a central processing unit and a graphics processing unit) 801 and a storage device 808 configured to store one or more programs. The processing device 801 may execute at least one appropriate action or processing according to one or more programs stored in a read-only memory (ROM) 802 or one or more programs loaded into a random access memory (RAM) 803 from the storage device 808. The RAM 803 is further configured to store one or more programs and data required for the operation of the terminal 800. The processing device 801, the ROM 802 and the RAM 803 are connected to each other by a bus 804. An input/output (I/O) interface 805 is also connected to the bus 804.

Generally, devices that can be connected to the I/O interface 805 include an input device 806 such as a touch screen, a touch pad, a keyboard, a mouse, a camera, a microphone, an accelerometer and a gyroscope; an output device 807 such as a liquid crystal display (LCD), a speaker and a vibrator; the storage device 808 such as a magnetic tape and a hard disk; and a communication device 809. The communication device 809 allows the terminal 800 to wirelessly or wiredly communicate with other devices to exchange data. Although FIG. 8 shows that the terminal 800 has various devices, it is to be understood that the terminal 800 is not required to implement or have all of the devices shown. The terminal 800 may alternatively implement or have more or fewer devices.

According to embodiments of the present disclosure, the process described above with reference to the flowchart may be implemented as a computer software program. For example, this embodiment of the present disclosure includes a computer program product. The computer program product includes a computer program carried in a computer-readable medium. The computer program contains program codes for implementation of the method shown in the flowchart. In such an embodiment, the computer program may be downloaded and installed from the network through the communication device 809, installed from the storage device 808, or installed from the ROM 802. When the computer program is executed by the processing device 801, the functions defined in the method of any one of embodiments of the present disclosure are performed.

In an embodiment, the computer-readable medium described above in the present disclosure may be a computer-readable signal medium, a computer-readable storage medium or a combination of any of the two. The computer-readable storage medium may be, for example, but not limited to, an electrical, magnetic, optical, electromagnetic, infrared or semiconductor system, device or element, or a combination of any of the above. The computer-readable storage medium may include, but is not limited to, an electrical connection having one or more wires, a portable computer disk, a hard disk, a RAM, a ROM, an erasable programmable read-only memory (EPROM), an optical fiber, a compact disc read-only memory (CD-ROM), an optical storage device, a magnetic storage device, or a suitable combination of any of the foregoing. In the present disclosure, the computer-readable storage medium may be any tangible medium containing or storing a program that may be used by or used in connection with an instruction execution system, device or element. In the present disclosure, the computer-readable signal medium may include a data signal propagated as part of a carrier wave or in a baseband, and the computer-readable signal medium carries computer-readable program codes. Such propagated data signal may take a variety of forms including, but not limited to, an electromagnetic signal, an optical signal, or a suitable combination of any of the foregoing. The computer-readable signal medium may also be any computer-readable medium other than a computer-readable storage medium. The computer-readable signal medium may send, propagate or transmit a program that may be used by or used in connection with an instruction execution system, device or element. The program codes included in the computer-readable medium may be transmitted using any suitable medium including, but not limited to, a wire, an optical cable, a radio frequency (RF), or a suitable combination of any of the foregoing.

The computer-readable medium may be included in the terminal, or may be present alone and not mounted in the terminal.

The computer-readable medium carries one or more programs which, when executed by the terminal, cause the terminal to perform the method as described in any embodiment of the present disclosure. For example, the terminal acquires at least two existing video segments selected by a user through a video selection interface, where the video selection interface is an interface which is switched from a video capture interface or a detail interface; and synthesizes the at least two existing video segments into a target video that has a duration less than or equal to a preset video duration.

Computer program codes for implementation of the operations of the present disclosure may be written in one or more programming languages or in a combination of multiple programming languages. The languages include object-oriented programming languages such as Java, Smalltalk and C++ or conventional procedural programming languages such as or "C" language or a similar programming language. The program codes may be executed entirely on a user computer, partly on the user computer, as a separate software package, partly on the user computer and partly on a remote computer, or entirely on the remote computer or a server. In the case involving the remote computer, the remote computer may be connected to the user computer through any type of network including a local area network (LAN) or a wide area network (WAN) or may be connected to an external computer (by using, for example, the Internet of an Internet service provider).

Flowcharts and block diagrams in the drawings illustrate architectures, functions and operations of possible implementations of systems, methods and computer program products according to one or more embodiments of the present disclosure. In this regard, each block in the flowcharts or the block diagrams may represent a module, a program segment, or a part of codes that contain one or more executable instructions for implementing a specified logical function. It is to be noted that in some implementations as alternatives, the functions noted in the blocks may be implemented in a different order than the order noted in the drawings. For example, two successively presented blocks may actually be executed substantially in parallel, and may sometimes be executed in the reverse order, depending on the functions involved. In an embodiment, each block of the block diagrams and/or the flowcharts and a combination of blocks in the block diagrams and/or the flowcharts may be implemented by a dedicated hardware-based system for performing specified functions or operations or may be implemented by a combination of dedicated hardware and computer instructions.

The modules or units described in embodiments of the present disclosure may be implemented by software or hardware. The name of a module or unit does not limit the module or unit.

What is claimed is:

1. A video acquisition method comprising:
    in response to a video multi-selection request triggered by a user on a video selection interface, acquiring at least two existing video segments selected by the user through the video selection interface, wherein the video selection interface is an interface which is switched from a music detail interface, and the video multi-selection request is generated when a multi-selection control in the video selection interface is clicked by the user; and
    synthesizing, based on a preset video duration and a video editing mode, the at least two existing video segments into a target video through a video editing interface, and using an audio of the music selection interface as a background music of the target video, wherein the target video has a duration less than or equal to the preset video duration;
    wherein the video editing interface comprises a first video editing interface and a second video editing interface, the first video editing interface is an interface which is switched from the video selection interface and is used to edit the at least two existing video segments, and the second video editing interface is an interface which is switched from the first video editing interface or the video selection interface and is used to edit one of the at least two existing video segments;
    wherein the video editing mode comprises an overall video editing mode through which copies of the at least two existing video segments are preliminarily synthesized to a complete video and an overall editing is performed on the complete video to obtain an overall editing effect of the complete video and a segment video editing mode through which a copy of each of the at least two existing video segments is separately edited to obtain an individual editing effect of each of the at least two existing video segments, and
    wherein synthesizing the at least two existing video segments into a target video comprises:
        independently performing processes in the overall video editing mode and processes in the segment video editing mode;
        adding the overall editing effect of the complete video to the individual editing effect of each of the at least two existing video segments to obtain a final editing effect of each of the at least two existing video segments, and
        synthesizing each of the at least two existing video segments with the final editing effect into the target video.

2. The method of claim 1, wherein in a case where the video editing mode is the overall video editing mode, synthesizing, according to the preset video duration and the video editing mode, the at least two existing video segments into the target video that has the duration less than or equal to the preset video duration comprises:
    synthesizing the at least two existing video segments into a continuous video that has a duration less than or equal to the preset video duration based on the preset video duration; and
    acquiring an editing operation to the continuous video by a user on the video editing interface and using the edited continuous video as the target video.

3. The method of claim 1, wherein in a case where the video editing mode is the segment video editing mode, synthesizing, according to the preset video duration and the video editing mode, the at least two existing video segments into the target video that has the duration less than or equal to the preset video duration, comprises:
    acquiring an editing operation to one of the at least two existing video segments at each time by a user on a video editing interface; and
    synthesizing, based on the preset video duration, the edited at least two existing video segments into the target video that has the duration less than or equal to the preset video duration.

4. The method of claim 2, wherein the video editing interface is provided with a video preview area, and the video preview area is configured for effect preview during video editing.

5. The method of claim 1, wherein an editing operation in the video editing mode comprises at least one of a clipping operation, a play speed editing operation, a resolution editing operation, a played picture rotation operation, a video deletion operation or a display effect adding operation.

6. The method of claim 1, wherein synthesizing, based on the preset video duration, the at least two existing video segments into the target video that has the duration less than or equal to the preset video duration comprises:
    synthesizing, according to a selection order of the at least two existing video segments, the at least two existing video segments into the target video that has the duration less than or equal to the preset video duration.

7. The method of claim 1, wherein a duration of each of the at least two existing video segments selected by the user is greater than or equal to a duration threshold.

8. The method of claim 1, further comprising:
    switching from a video editing interface to the video selection interface in response to detecting an editing abandoning request, wherein a selection state of the at least two existing video segments by the user is maintained on the video selection interface.

9. A non-transitory computer-readable storage medium storing one or more programs which, when executed by the one or more processing devices, cause the one or more processing devices to perform the method of claim 1.

10. A device comprising a processor and a memory for storing executable instructions that when executed by the processor cause the device to:
    in response to a video multi-selection request triggered by a user on a video selection interface, acquire at least two existing video segments selected by the user through the video selection interface, wherein the video selection interface is an interface which is switched from a music detail interface, and the video multi-selection request is generated when a multi-selection control in the video selection interface is clicked by the user; and synthesize, based on a preset video duration and a video editing mode, the at least two existing video segments into a target video through a video editing interface, and using an audio of the music selection interface as a background music of the target video, wherein the target video has a duration less than or equal to the preset video duration;

wherein the video editing interface comprises a first video editing interface and a second video editing interface, the first video editing interface is an interface which is switched from the video selection interface and is used to edit the at least two existing video segments, and the second video editing interface is an interface which is switched from the first video editing interface or the video selection interface and is used to edit one of the at least two existing video segments;

wherein the video editing mode comprises an overall video editing mode through which copies of the at least two existing video segments are preliminarily synthesized to a complete video and an overall editing is performed on the complete video to obtain an overall editing effect of the complete video and a segment video editing mode through which a copy of each of the at least two existing video segments is separately edited to obtain an individual editing effect of each of the at least two existing video segments, and synthesizing the at least two existing video segments into a target video comprises:

independently performing processes in the overall video editing mode and processes in the segment video editing mode;

adding the overall editing effect of the complete video to the individual editing effect of each of the at least two existing video segments to obtain a final editing effect of each of the at least two existing video segments, and synthesizing each of the at least two existing video segments with the final editing effect into the target video.

11. The device of claim 10, wherein in a case where the video editing mode is the overall video editing mode, the device is configured to synthesize, according to the preset video duration and the video editing mode, the at least two existing video segments into the target video that has the duration less than or equal to the preset video duration by:

synthesizing the at least two existing video segments into a continuous video that has a duration less than or equal to the preset video duration based on the preset video duration; and acquiring an editing operation to the continuous video by a user on a video editing interface and using the edited continuous video as the target video.

12. The device of claim 10, wherein in a case where the video editing mode is the segment video editing mode, the device is configured to synthesize, according to the preset video duration and the video editing mode, the at least two existing video segments into the target video that has the duration less than or equal to the preset video duration by:

acquiring an editing operation to one of the at least two existing video segments at each time by a user on a video editing interface; and synthesizing, based on the preset video duration, the edited at least two existing video segments into the target video that has the duration less than or equal to the preset video duration.

13. The device of claim 11, wherein the video editing interface is provided with a video preview area, and the video preview area is configured for effect preview during video editing.

14. The device of claim 10, wherein an editing operation in the video editing mode comprises at least one of a clipping operation, a play speed editing operation, a resolution editing operation, a played picture rotation operation, a video deletion operation or a display effect adding operation.

15. The device of claim 10, wherein the device is configured to synthesize, based on the preset video duration, the at least two existing video segments into the target video that has the duration less than or equal to the preset video duration by:

synthesizing, according to a selection order of the at least two existing video segments, the at least two existing video segments into the target video that has the duration less than or equal to the preset video duration.

16. The device of claim 10, wherein a duration of each of the at least two existing video segments selected by the user is greater than or equal to a duration threshold.

17. The device of claim 10, when the executable instructions executed by the processor cause the device further to:

switch from a video editing interface to the video selection interface in response to detecting an editing abandoning request, wherein a selection state of the at least two existing video segments by the user is maintained on the video selection interface.

* * * * *